United States Patent [19]

Chi

[11] 4,430,291

[45] Feb. 7, 1984

[54] PACKED FLUIDIZED BED BLANKET FOR FUSION REACTOR

[75] Inventor: John W. H. Chi, Mt. Lebanon, Pa.

[73] Assignee: The United States of America as represented by the United States Department of Energy, Washington, D.C.

[21] Appl. No.: 262,729

[22] Filed: May 12, 1981

[51] Int. Cl.³ .............................................. G21B 1/00
[52] U.S. Cl. ..................................... 376/146; 376/355
[58] Field of Search ........................ 376/100, 146, 355

[56] References Cited

U.S. PATENT DOCUMENTS

| 3,037,921 | 6/1962 | Tuck | 376/146 |
|---|---|---|---|
| 3,039,945 | 6/1962 | Slack et al. | 376/355 |
| 3,294,645 | 12/1966 | Susskind et al. | 376/355 |
| 3,389,054 | 6/1968 | Kovacic | 376/355 |
| 3,420,738 | 1/1969 | Grant | 376/355 |
| 4,116,264 | 9/1978 | Casali et al. | 376/146 |

FOREIGN PATENT DOCUMENTS

| 1059121 | 6/1959 | Fed. Rep. of Germany | 376/146 |
|---|---|---|---|
| 1559778 | 2/1969 | France | 376/355 |

OTHER PUBLICATIONS

AICHE Symposium Series, 1979, vol. 75, No. 191, "Reactor Concepts for Laser Fusion", Meier et al., pp. 164–172.
ANS Trans. vol. 22, Nov. 1975, pp. 21, 22, Sze et al.
ANS Third Topical Meeting on the Technology of Controlled Nuclear Fusion, May 1978, pp. 83–86, Khalik et al.
UWFDM-190, Dec. 1976, Conn et al., pp. (VI-A-3)-(-VI-A-7).
BNWL-2097, 8176, p. 1.
Nuclear Fusion, Special Suppl., 1974, pp. 27–49, Sako et al.
Nuclear Technology, vol. 24, 1/79, Chao et al., pp. 22–33.

Primary Examiner—Harvey E. Behrend
Attorney, Agent, or Firm—K. R. Bowers; Z. L. Dermer

[57] ABSTRACT

A packed fluidized bed blanket for a fusion reactor providing for efficient radiation absorption for energy recovery, efficient neutron absorption for nuclear transformations, ease of blanket removal, processing and replacement, and on-line fueling/refueling.

The blanket of the reactor contains a bed of stationary particles during reactor operation, cooled by a radial flow of coolant. During fueling/refueling, an axial flow is introduced into the bed in stages at various axial locations to fluidize the bed. When desired, the fluidization flow can be used to remove particles from the blanket.

1 Claim, 6 Drawing Figures

PACKED FLUIDIZED BED BLANKET FOR FUSION REACTOR

GOVERNMENT CONTRACT

This invention was conceived during performance of a contract with the United States Government designated EG-77-C-02-4544.

BACKGROUND OF THE INVENTION

This invention relates to a structure to surround the fusion plasma of a fusion reactor, or other fusion plasma containing device, said structure commonly called a blanket.

Fusion reactors of all varieties produce energetic neutrons which can advantageously be captured in a blanket region or structure substantially or completely surrounding the reactor core. In a fusion-fission hybrid reactor, the blanket contains a fertile fuel intended to breed fissile fuel and to produce energy by neutron induced fission. In a pure fusion reactor, the blanket contains fertile species which capture neutrons to form valuable isotopes. In both reactor types, the blanket is cooled by a coolant by which means heat is transferred away to cool the reactor, and perhaps generate useful power.

While many nuclear transformations are possibly of interest in a fusion reactor blanket, the generation of tritium from a neutron-induced nuclear reaction of lithium nuclei is especially important since tritium is a fusion reactor fuel.

The design of a suitable blanket is considered a significant obstacle to the development of a practical fusion power reactor. Several concepts have been proposed encompassing liquid lithium or solid lithium compounds for tritium breeding, solid fertile fuel for fissile element breeding, and gas, liquid, and even pebble bed coolants. All have technical handicaps. A solid blanket must be replaceable for isotope recovery and for blanket repair which, it develops, is a difficult task. A liquid lithium blanket can be continually or intermittently processed for tritium recovery and can readily be used to recover heat deposited therein by conventional means. However, liquid lithium and other liquid metals in the presence of the strong magnetic fields (in magnetic confinement fusion reactors) experience magnetohydrodynamic forces which limit the serviceability of that type of blanket. Gas cooled blankets have intrinsically lower material densities which reduce the efficiencies of heat transfer. Pebble bed blankets generally require high coolant pumping power.

Consequently, it is desired to provide a blanket for a fusion reactor which can be refueled on-line, has high density, and is well adapted for power and isotope production.

SUMMARY OF THE INVENTION

The invented blanket is a bed of solid fuel particles which serve to absorb radiation from the fusion plasma. The bed is a packed bed during reactor operation but is fluidized intermittently for fuel particle removal when desired. The particles are chosen to be $UO_2$, $UC$, $ThO_2$, Th-ZR, $Li_7Pb_2$, $L_2O$ or other "fuel" material as desired depending partially upon the nuclear transformation in the blanket to be achieved. The particles may be spheres, which if sized between 40 to 300 microns in diameter are termed microspheres. In some cases, it may be desired to enclose each fuel particle with a metal cladding. The bed is contained in each of a series of pressure tubes sufficient in number to substantially or completely surround the plasma region, the assembly of all such pressure tubes constituting the blanket for the reactor.

During operation of the reactor, coolant, perhaps helium, flows radially through the bed of solid particles and removes blanket heat. The same coolant can be used to generate power by various processes, including the generation of steam in an external heat exchanger/steam generator.

The arrangement of coolant flow through the particle bed is considered best if it is radially outward since the radial flow path is short compared to the axial length of the pressure tube and consequently minimizes coolant pumping power requirements and coolant pressure.

For blanket fueling/refueling, (particle replacement), coolant flow is stopped and a second fluid, most likely of composition identical to the coolant, is passed axially upward through the particle bed. This "fluidizing" stream serves to transport the bed fuel particles out of the pressure tube for replacement and/or reprocessing. Replacement is performed intermittently during shutdown of the reactor or even during operation. On-line refueling capability is of significant advantage in a fusion-fission hybrid reactor because the rate of fission reactions in the fuel particles caused by the buildup of fissionable nuclei due to neutron reactions in fertile nuclei can be controlled by approprite removal of the enriched particles and replacement with new fertile particles. Also, in the case of a pure fusion reactor, the net yield from the reactor of radioactively decaying tritium can be increased by continuous or frequent removal and early use of the isotope.

The blanket is provided with a series of staged fluidization flow distributors to allow the fluidization and/or removal of particles in stages so as to minimize the required fluidization flow pumping power.

DETAILED DESCRIPTION

Figure 1:
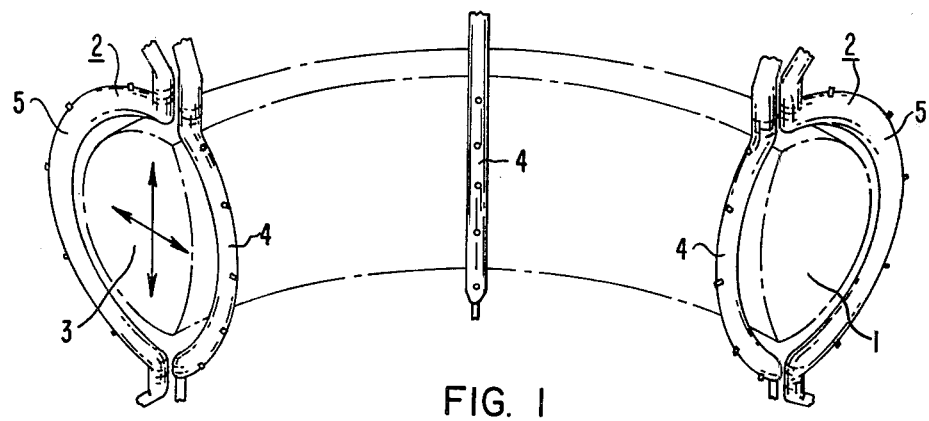
FIG. 1 is a schematic diagram of the general blanket arrangement.

Refer to FIG. 1 which is a schematic section of a Tokamak fusion reactor utilizing a packed-fluidized bed blanket. In FIG. 1, a section of the doughnut-like reactor is shown in which a core region 1 is surrounded by a plurality of pressure tubes 2, several of which are shown in FIG. 1, the rest being omitted for clarity. In practice, sufficient tubes 2 are installed such that most if not all radiation 3 emitted by the plasma in core region 1 is interdicted by tubes 2. The overall blanket is a grouping of inner pressure tubes 4 and outer pressure tubes 5. Tubes 2 contain the fuel particles of the packed fluidized bed.

Figure 2:
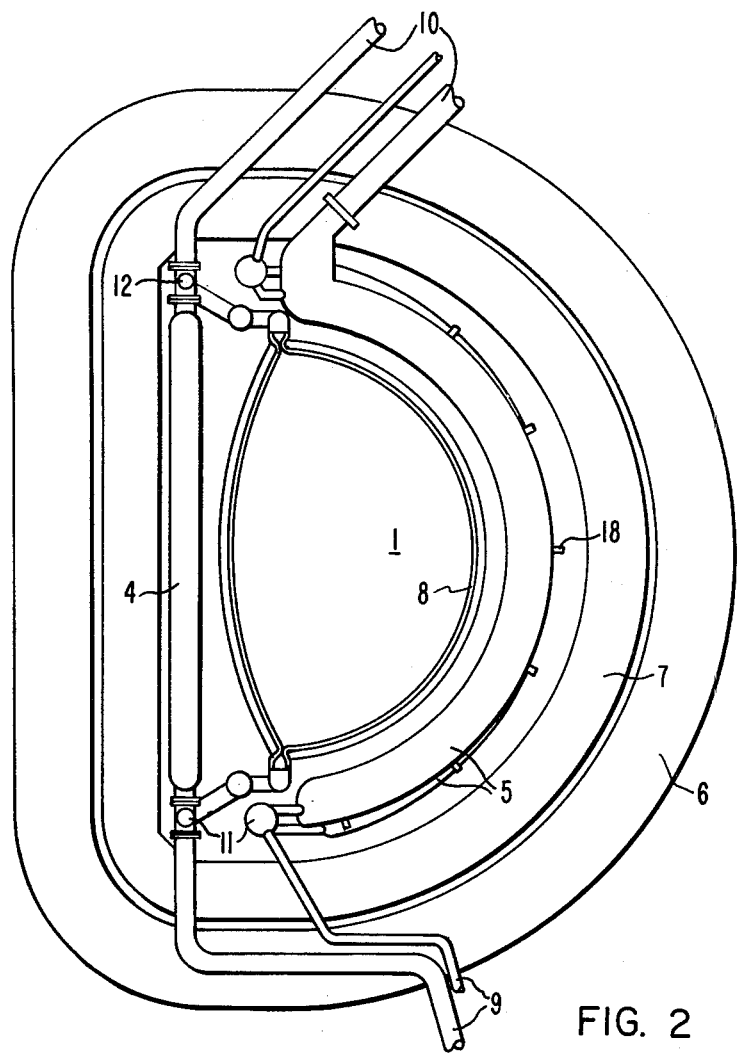
FIG. 2 is a plan view schematic of a Tokamak reactor.

FIG. 2 is a schematical plan view of a typical Tokamak hybrid reactor. FIG. 2 shows field coil 6 and shield 7 which surround and restrict access to the blanket of the reactor. Vacuum vessel 8 contains core region 1.

Inner pressure tubes 4 and outer pressure tubes 5 have coolant inlets 9 and coolant outlets 10 served by inlet manifolds 11 and outlet manifolds 12, which manifolds 11 and 12 are used to distribute (or collect) coolant flow to (or from) all pressure tubes 4 or 5.

Figure 3:
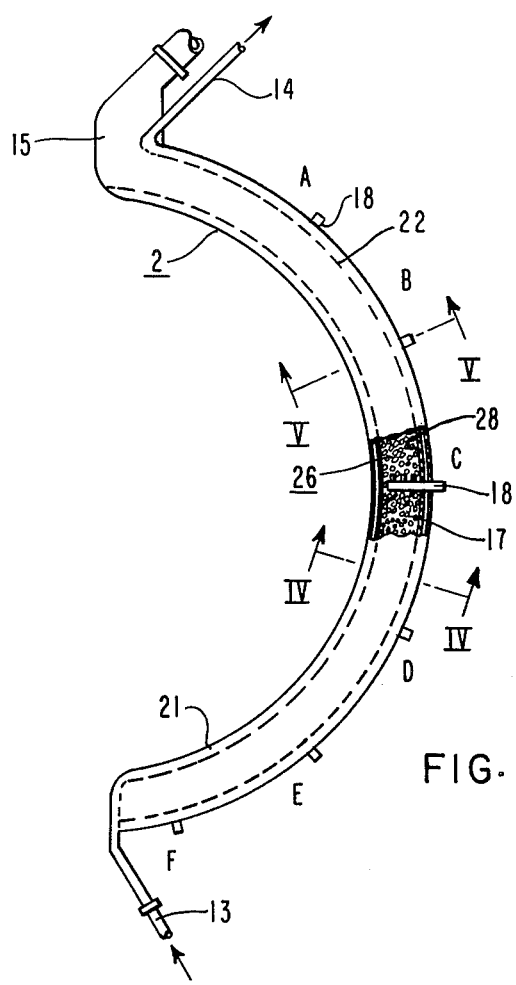
FIG. 3 is a schematic section of one pressure tube.

Refer to FIG. 3 which is a schematic of one pressure tube 2 from FIG. 1 or 2, which could be either an inner pressure tube 4 or an outer pressure tube 5. Tube 2 has tube inlet 13 and tube outlet 14 for routing of coolant flow to and from the manifolds 11 and 12 shown in FIG. 2. Pressure tube 2 is shown to have a fuel outlet and inlet port 15 for fuel particle 17 replacement during refueling. Port 15 may be arranged to distribute particles to many tubes 2 via a manifold or may be provided individually to each tube as shown in FIG. 3.

All pressure tubes 2 have fluidization rakes 18 at various elevations. These rakes 18 have a source of fluidization flow (not shown) which may be individual to each rake 18 or which may have a grouping such as, for example, all rakes 18 of all tubes 4 and 5 at a common elevation.

Figure 4:
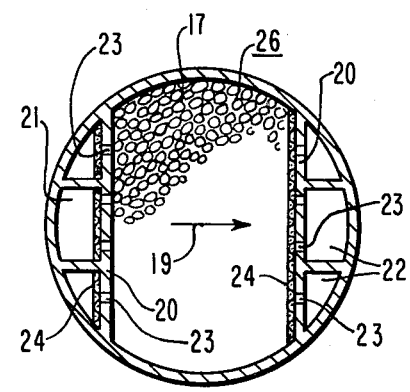
FIG. 4 is a schematic section from FIG. 3.

Refer to FIG. 4. This Figure is a section as indicated from FIG. 3. Arrow 19 shows the direction of coolant flow during reactor operation. Support walls 20 function to form coolant inlet and coolant outlet volume manifolds 21 and 22. Walls 20 have holes 23 to permit coolant flow passage. Screens 24, supported by walls 20 as shown, prevent carryover of particles 17 in the coolant flow. Screens 24 have a mesh, or hole size, considerably smaller than the particle diameter such that the screens 24 do not become plugged or blocked but do function to prevent particle passage.

The pressure tubes need not have the circular cross-section as indicated in FIG. 4 but could be square, rectangular, or of other geometry.

Figure 5:
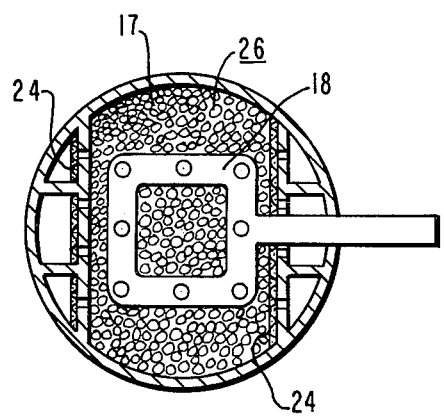
FIG. 5 is a schematic section from FIG. 3.

Refer to FIG. 5. This schematic section through a typical rake in FIG. 3 shows one possible geometric shape of this component which serves to distribute fluidization flow over the cross-sectional area of the tube which contains particles and to direct the flow upward.

Figure 6:
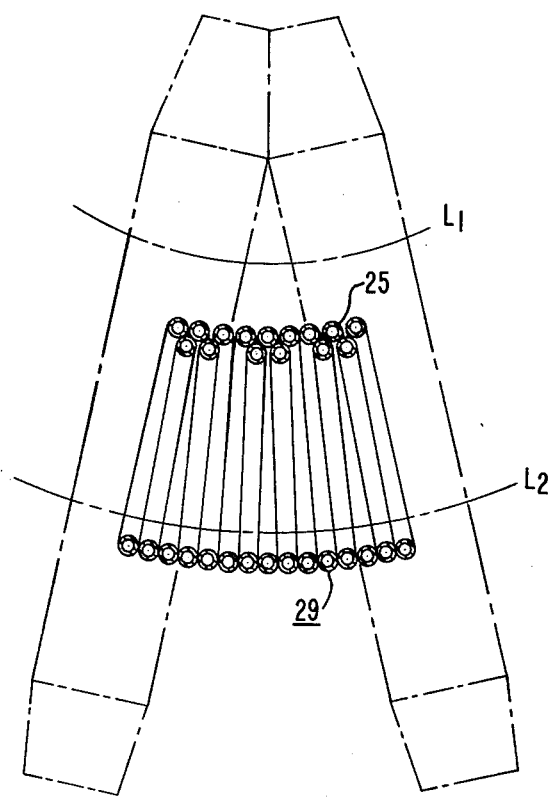
FIG. 6 is a schematic illustrating the arrangement of pressure tubes.

Refer to FIG. 6. Because of the geometric shape of the reactor, the perimeter of a circle drawn on the inside surface of the reactor ($L_1$) is less than the perimeter of a circle drawn on the outside surface ($L_2$). In order for sufficient pressure tubes 2 to be installed to interdict all radiation from the reactor, an overlap 25 of tubes must occur in certain regions (core top and bottom) as illustrated in FIG. 6. In other regions, tubes 2 abut without overlap (see region 29).

An operational cycle of the reactor will be described to illustrate the packed fluidized bed blanket concept. Refer again to FIG. 3. Prior to reactor operation, all pressure tubes 2 are filled with particles 17 using port 15. Packing of the bed to a high density is desirable since a high density enhances neutron absorption rates which produce useful nuclear transformations, permits efficient use of blanket space, and improves the efficiency of energy deposition in the bed. Isolation valves in the port 15 piping (not shown) are then closed. The flow of the main coolant is begun, entering via inlet tube 13, passing through inlet plenum 21, (in FIG. 4) through screen 24 and into the packed bed 26 of particles 17. The coolant flow is in the radial direction through the packed bed 26, as shown by arrow 19, and exits via outlet plenum 22 and outlet tube 14 (in FIG. 3). External systems may be used to recover heat from this coolant flow.

During reactor shutdown, coolant flow is stopped and fluidization flow is initiated. This flow enters via rakes 18, passes axially upward through packed bed 26 and exits via outlet port 15. This flow can be used to remove blanket heat.

Fluidization is a process technology which has been successfully utilized in a variety of applications. The basic principle is as follows: a coolant, usually a gas, is passed upward through a bed of granular particles at such a rate that the drag on the particles opposes gravity and causes the particle to be suspended. A further increase in gas flow causes the appearance of gas bubbles which rise through the bed causing vigorous circulation and mixing of the bed solids around the bubbles.

The mixture of particles in fluidizing gas forms a dynamic froth of particles in gas defined here as a "fluidized" bed, which, besides having excellent thermal conductivity, also can be arranged to have a high density while still being easily transferable by pumping.

When it is time to remove particles for processing and replacement, the fluidization flow is introduced via the staged fluidization rakes 18 at a sufficient flow rate to cause particle streaming out of the blanket via outlet 15 (FIG. 3).

The containing walls 28 in FIG. 3 must sustain the pressure applied to pressure tube 2 by both the coolant and the fluidization flow streams. Naturally, the strength and thickness of walls 28 are determined by the greater of these two pressures. Since the radial path of the coolant flow is relatively short, as compared to the axial fluidization flow path, the tendency is for the required pressure to achieve the necessary fluidization flow rate to be greater than the required coolant flow pressure, potentially requiring thick walls 28. Consequently, a plurality of flow rakes 18 are provided to reduce the pressure needed to produce fluidization and removal of particles. In practice, the flow rakes 18 would be actuated in sequence from A to F (see FIG. 3) to remove the bed of particles in stages. Sufficient flow rakes 18 may be provided such that the necessary fluidization and coolant pressures are about the same, thereby minimizing the required wall 28 thickness.

The fluidization flow can serve purposes in addition to fuel particle removal. This flow can serve for backup or emergency heat removal and can be used to mix the fuel particles when desired to achieve uniform radiation exposure.

Since the particle bed expands during fluidization operation, staged fluidization reduces any void volume which must be maintained in the pressure tubes to accommodate this expansion, since only a fraction of the bed is fluidized at any one time.

Table 1 is included to illustrate parameters presently considered pertinent to a preferred embodiment of the packed fluidized bed blanket as applied to a commercial Tokamak hybrid reactor.

TABLE 1

| Packed Bed Operation | |
|---|---|
| Helium inlet pressure | = 50 Atm |
| Helium inlet temperature | = 350° C. |
| Helium flowrate | = 1800 kg/s |
| Helium pressure drop through the packed bed | = .166 MPa |
| Total helium pumping power | = 8.8 MWe (<0.5 percent of blanket thermal power) |
| Peak local power density (assumed) | = 50 W/cm$^3$ |
| Maximum film temperature drop | = 0.65° C. |

TABLE 1-continued

| | |
|---|---|
| (particle to coolant) | |
| Maximum particle temperature | = 480° C. |
| Fluidized Bed Operation | |
| Stage height | = 2 m |
| No. of stages | = 5 |
| Pressure drop for fluidization | = 0.141 MPa |
| Fluid (helium) inlet pressure | = 30 Atm |
| Helium temperature | = 77° C. |
| Fluidization velocity | = 0.41 m/s |
| Helium flowrate for full blanket | = 265 kg/s |
| Helium pumping power (refueling one blanket segment at a time, total of 32 segments assumed) | = 7.8 MWe |
| Blanket Auxiliary or Emergency Cooling Parameters | |
| Coolant path length | = 10 meters (flow through the lowermost rake) |
| Coolant pressure, average | = 30 Atm |
| Coolant inlet temperature | = 100° C. |
| Coolant ΔT | = 300° C. |
| Helium Flowrate | = 126 kg/s |
| Decay Heat Level | = 0.01 of full power |
| Pressure drop through blanket | = 0.209 MPa |
| Total pressure drop | = 0.251 MPa |
| Coolant pumping power (85 percent efficient compressor) | = 0.66 MWe |

The above specification and the drawings are susceptible to various modifications without deviation from the true spirit and scope of the invention. For example, the fluidization flow and coolant flow described, if never commingled but rather separated by differing periods of operation, may be of different composition, perhaps helium and carbon dioxide respectively, or may even include water. Therefore, this disclosure should be interpreted as illustrative rather than limiting.

I claim:

1. In a fusion plasma system having a circular cross section, said fusion system substantially surrounded by a blanket structure for the capture and transmittal of energy from said plasma, wherein said blanket structure comprises:
 (A) a plurality of semicircular pressure tubes, each said tube including two spaced apart substantially parallel perforated walls having an enclosed volume therebetween and defining inlet and outlet conduits outside said enclosed volume said plurality of tubes substantially surrounding said plasma containing system;
 (B) first supply means for supplying a fluid coolant flow in a first direction across each of said volumes by means of said inlet and outlet conduits, said first direction being radial to said reactor circular cross section;
 (C) second supply means for supplying a fluidization fluid flow in a second direction, in each said volume along the length thereof of each of said tubes, which second direction is substantially opposite the direction of gravitational acceleration, and perpendicular to said first direction; and
 (D) a plurality of fuel particles located within each of said volumes, and wherein the fluidization flow in the second direction passes through a particle bed path substantially greater in length than that particle bed path traversed by the coolant flow in the first direction, the combination with each pressure tube of a plurality of flow rakes, located at various elevations along the second direction, said flow rakes being annular tubes with a plurality of holes arranged to distribute said second supply means approximately uniformly over the cross section of said pressure tube, said plurality of flow rakes adapted as above to accomplish staged and distributed fluidization flow in said second direction.

* * * * *